United States Patent
Bunch et al.

(10) Patent No.: US 12,445,342 B2
(45) Date of Patent: Oct. 14, 2025

(54) POLICY GOVERNED SOFTWARE AGENT SYSTEM AND METHOD OF OPERATION

(71) Applicants: Larry Bunch, Gulf Breeze, FL (US); Jeffrey M. Bradshaw, Pace, FL (US); Marco Mattos Carvalho, Satellite Beach, FL (US); Thomas C. Eskridge, Satellite Beach, FL (US); Paul J. Feltovich, Pensacola, FL (US); James Lott, Pensacola, FL (US); Andrzej Uszok, Pensacola Beach, FL (US); Maggie Breedy, Pensacola, FL (US); Roger Carff, Cantonment, FL (US)

(72) Inventors: Larry Bunch, Gulf Breeze, FL (US); Jeffrey M. Bradshaw, Pace, FL (US); Marco Mattos Carvalho, Satellite Beach, FL (US); Thomas C. Eskridge, Satellite Beach, FL (US); Paul J. Feltovich, Pensacola, FL (US); James Lott, Pensacola, FL (US); Andrzej Uszok, Pensacola Beach, FL (US); Maggie Breedy, Pensacola, FL (US); Roger Carff, Cantonment, FL (US)

(*) Notice: Subject to any disclaimer, the term of this patent is extended or adjusted under 35 U.S.C. 154(b) by 325 days.

(21) Appl. No.: 16/167,571

(22) Filed: Oct. 23, 2018

(65) Prior Publication Data
US 2019/0068451 A1  Feb. 28, 2019

Related U.S. Application Data

(63) Continuation of application No. 14/801,018, filed on Jul. 16, 2015, now abandoned.

(60) Provisional application No. 62/025,035, filed on Jul. 16, 2014.

(51) Int. Cl.
*H04L 41/0893* (2022.01)
*H04L 41/046* (2022.01)

(52) U.S. Cl.
CPC ........ *H04L 41/0893* (2013.01); *H04L 41/046* (2013.01)

(58) Field of Classification Search
CPC ........... G06F 21/604; G06F 2221/2145; H04L 63/20; H04L 41/046; H04L 41/0893
See application file for complete search history.

(56) References Cited

U.S. PATENT DOCUMENTS

| | | | |
|---|---|---|---|
| 9,628,550 B1* | 4/2017 | Talton | H04L 41/046 |
| 2004/0268186 A1* | 12/2004 | Maturana | G05B 19/4148 |
| | | | 714/38.14 |
| 2012/0131164 A1* | 5/2012 | Bryan | G06F 21/604 |
| | | | 709/223 |
| 2013/0086627 A1* | 4/2013 | Bryan | H04L 63/10 |
| | | | 726/1 |
| 2013/0268997 A1* | 10/2013 | Clancy, III | H04L 63/0227 |
| | | | 726/1 |

(Continued)

*Primary Examiner* — Jason D Recek
(74) *Attorney, Agent, or Firm* — J. Wiley Horton

(57) ABSTRACT

A system and method for deploying software agents in a policy-governed environment. The use of over-arching policies to control the actions and interactions of the software agents preserves desirable agent autonomy without allowing unwanted and potentially unpredictable (or at least difficult-to-predict) agent behavior. The system allows the agents to be deployed in a high-assurance environment.

20 Claims, 6 Drawing Sheets

(56) References Cited

U.S. PATENT DOCUMENTS

| | | | |
|---|---|---|---|
| 2014/0130119 A1* | 5/2014 | Goldschlag | H04L 63/20 726/1 |
| 2014/0143826 A1* | 5/2014 | Sharp | H04L 63/105 726/1 |
| 2014/0162645 A1* | 6/2014 | Cui | H04W 48/18 455/435.2 |
| 2014/0194094 A1* | 7/2014 | Ahuja | H04L 63/107 455/410 |
| 2014/0201145 A1* | 7/2014 | Dorman | G06F 16/27 707/634 |
| 2015/0089026 A1* | 3/2015 | Payette | H04L 65/605 709/219 |

* cited by examiner

POLICY GOVERNED SOFTWARE AGENT SYSTEM AND METHOD OF OPERATION

CROSS-REFERENCES TO RELATED APPLICATIONS

This non-provisional patent application is a continuation of U.S. patent application Ser. No. 14/801,018. The parent application listed the same inventors.

STATEMENT REGARDING FEDERALLY SPONSORED RESEARCH OR DEVELOPMENT

Some of the work underlying this application has been federally sponsored.

MICROFICHE APPENDIX

Not Applicable.

BACKGROUND OF THE INVENTION

1. Field of the Invention

The present invention pertains to the field of computer hardware and software. More specifically, the invention comprises a policy-governed system for software agents and a method for controlling the operations thereof.

2. Description of the Related Art

Automated data collection and dissemination systems now make it possible to accumulate and distribute vast quantities of information. In order to be useful, this information must ultimately be provided to appropriate people in an understandable form. Unfortunately, the modern problem is not that of having too little information but rather the problem of being inundated with too much information.

One good example is the field of counter-terrorism. It is possible to monitor much of the traffic occurring on world-wide computer networks. The amount of actually useful information contained in the global traffic volume that is pertinent to "black hat" hacking could be likened to a "needle in a haystack," but in reality the proportion of useful information is much smaller. It is simply not possible for a human operator to sift through such a daunting volume in order to find the tiny amount of relevant information. On the other hand—at least in the present context—only a human operator is able to contextualize and cross-link much of the truly valuable information. It is therefore desirable to augment the human operator's abilities by selecting only the potentially relevant information from the deluge of available data.

Software agents have been used to accomplish this and other tasks. As those skilled in the art will know, a "software agent" is typically a piece of computer code that resides on one or more pieces of remote hardware. An agent is often able to carry out tasks autonomously and independently of the actions of the over-arching system it serves. It may review all the locally-available data and provide a "filtering" function by only passing along information that is relevant and in need of further scrutiny. This filtered information can be passed on to humans or to other collections of agents for further analysis. In this way, software agents can help to make sense of an overwhelming body of data. The agents can even exist on multiple levels, with each level providing not only local filtering but also additional functions.

The tasks performed by an agent are often independent of the system on which it resides. Tasks that may be performed include:

1. Seeking, filtering and aggregating available information;
2. Selecting certain information to be forwarded to people, other agents, or to another system;
3. Altering the state of available information (such as by taking a raw sensor value and interpreting it as an "exceedance" requiring external attention); and
4. Taking some complex, affirmative, goal-directed actions of other kinds on behalf of people.

An agent's autonomous, goal-directed capabilities allow the actions it takes to be more diverse and flexible than other kinds of software. For example, agents may need to initiate human-like conversations with people to convey or gather information. They may perform control functions on complex equipment. They may execute complex financial transactions, and so forth.

An agent may "move" from one host location to another as the computational environment changes. For security reasons, the software code implementing the agent is not typically relocated. Instead, the code for the agent is often already stored in the various locations where it might be needed. In order to "move" the agent, the operational ("active") state of the agent is simply transferred from one location to the next and the code for the agent is locally activated with that operational state.

The presence and operation of a software agent is often not visible to the computer system hosting it. In many respects the agent operates independently (though obviously it must share some processor time on the host in order to run). An advantage of this approach is that the host computer system can be relieved of duties such as reporting to another system. The agent takes care of this.

From these descriptions, the reader will appreciate that software agents may be configured to act autonomously and that they may be beyond the control of the hosting system. Moreover, because the specifics of how goals are to be accomplished by the agent are relatively unspecified, the behavior and consequences of agent actions nay be much more unpredictable that the behavior and results of traditional software whose execution is more predictably algorithmic in nature. For this reason, people may be uncomfortable delegating such activities to agents. The nature of such agents can cause concern regarding security, privacy, and control. These concerns are particularly acute when highly-secure information and operations are involved. It is therefore desirable to provide an agent-based system and method that retains the advantages of software agents yet reduces or eliminates these perceived concerns.

BRIEF SUMMARY OF THE INVENTION

The present invention comprises a system and method for deploying software agents as part of a policy-governed environment. The use of overarching policies to constrain the actions and interactions of the software agents preserves desired agent autonomy within desired bounds without allowing unwanted and potentially unpredictable (or at least difficult-to-predict) agent behavior. Because policy interpretation and enforcement may be performed as part of the agent system rather than necessarily programmed separately into each agent, the system reduces the burden on agent programmers and can guarantee individual agent compliance with system policies, even when those agents may be buggy, poorly designed, or deliberately malicious. The integration of a policy management system with the agent system allows the agents to be deployed in high-assurance environments.

REFERENCE NUMERALS IN THE DRAWINGS

Figure 1:
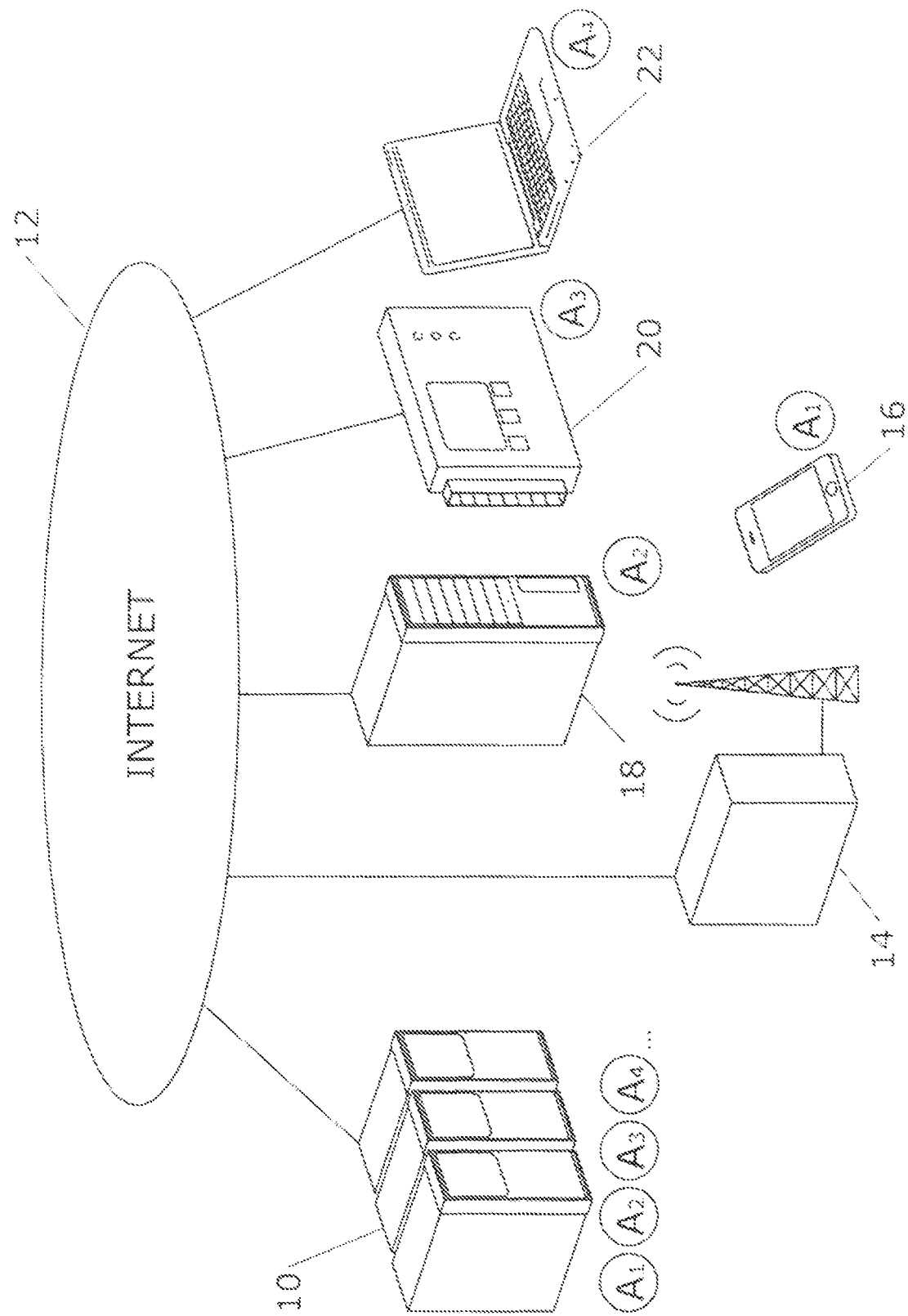
FIG. 1 is a schematic view, showing one way that multiple independent computers can be connected.

10 data servers
12 internet
14 cellular provider
16 smart phone
18 remote server
20 programmable logic controller
22 laptop
24 computing device
26 communication link
28 fractioning tower
30 pumping station
32 boiler The present invention embeds software agents within a policy-based system that governs the actions of the agents. The agents are permitted to behave autonomously within the bounding constraints of policy structures. In this way the advantages of autonomous agents are realized while reducing the security, privacy, and control risks of the agent approach. In addition, the burden of agent programmers is reduced because the policy-governed agent system has the ability to describe a novel agent's capabilities to the policy system and bring that agent's actions (i.e. methods/functions) under policy control—without changing any code in the agent, policies, or agent framework.

The governing policies on the computing device hosting the software agent can be combined with or can take precedence over policies that were in effect when the agent operated in an external environment. This feature provides additional security for the host and alleviates concerns regarding allowing an external agent to reside on the host since the host can ultimately allow or deny the agent's proposed functions.

FIG. 1 graphically depicts one way in which multiple distributed computing devices may be connected in order to allow two-way communication. Data servers 10 are connected to Internet 12. Other computing devices are also connected to Internet 12, including remote server 18, programmable logic controller 20, and laptop 22. A computing device under the control of cellular provider 14 may also be connected to the Internet. This device receives signals and transmits them using radio waves. Smart phone 16 (another computing device) links to tire Internet over the cellular network.

All the connections shown are merely exemplary. As those skilled in the art will know, computing devices may be connected using radio waves, copper conductors, fiber optic lines, and other communication methodologies. In addition, the communications may be encrypted in various ways. The actual method of communication is not important to the present invention.

Mobile software agents can relocate their execution onto different processors. The computer code comprising the agent does not typically relocate to different processors (other than at the time of its initial installation). Rather, the execution state relocates. The code needed to run the software agent may be present on multiple different processors. However, the software agent may only be active on a subset of the available processors (and perhaps one or none). The transfer occurs by sending the agent's execution state to a particular processor as will be explained in more detail subsequently.

FIG. 1 shows the presence of multiple software agents on the data servers 10 (agents $A_1$, $A_2$, . . . ). The agents are created and then stored on one or more servers such as those shown in FIG. 1. The code implementing each agent may then be transferred to the various computing devices, where it will remain. An execution state may later be transferred to activate a particular agent. The agent may then perform its functions and respond by communicating some information back to data servers 10 or to some other recipient as appropriate.

An exemplary application may assist the reader's understanding. Software agents may be used to monitor and even control functions in a large and widely distributed industrial chemical process. Such a process typically includes many temperature, pressure, and flow sensors. It may also include pump speed sensors, energy input sensors, and alkalinity sensors. An individual industrial controller may be present at each large component (such as a programmable logic controller regulating the operation of a single boiler). The programmable logic controller ("PLC") performs many functions that the overall plant control process does not need to know about. If, for example, the boiler operates a continuous process where the pressure and temperature remain the same, then very little needs to be known unless there is a problem. The overall plant control process might use a software agent loaded on the PLC controlling the boiler. Under normal conditions that agent might simply send a periodic message saying "monitoring functions active: all parameters within normal limits." An important insight is that new agents can be introduced into the system at any time. In this way, the functionality of the plant's monitoring and control system can be enhanced by third-parties in ways not envisioned by its designers and developers, and without any changes to the existing code in the system.

The user or users responsible for the overall control of the chemical plant are preferably given a graphical interface to establish the agent-based network. As an example, the relevant components may be represented by blocks on a block function diagram. The diagram could include a block for each of the many, many sensors and controllers. Each potential agent host computing device could also be depicted. The user could create monitoring and reporting functions by clicking and dragging graphical elements from the agents to the sensors and other components. This graphical input would then be used to create governing policies that control the actions and interactions of the agents, users, sensors, and controllers.

As one simple example, a user might wish to create a series of "notification" actions that would be carried out in the event a boiler reaches 90% of its designed operational pressure. Unlike simple notification triggers, the policy system allows rich situational know ledge to be used as part of the decision-making in knowing whether such a notification should be executed. The created policy might instruct the network of agents to (1) notify the maintenance technician with responsibility for the boiler, (2) failing that notify the site supervisor, (3) failing that take some automatic action to reduce the boiler pressure (such as by reducing the fuel flow to a burner bank). Policies might also notify other agents to take actions (e.g., to log the event in question) or to specify their preferred modality of notification (e.g., email, text message, phone) and the urgency of particular kinds of messages.

Figure 2:
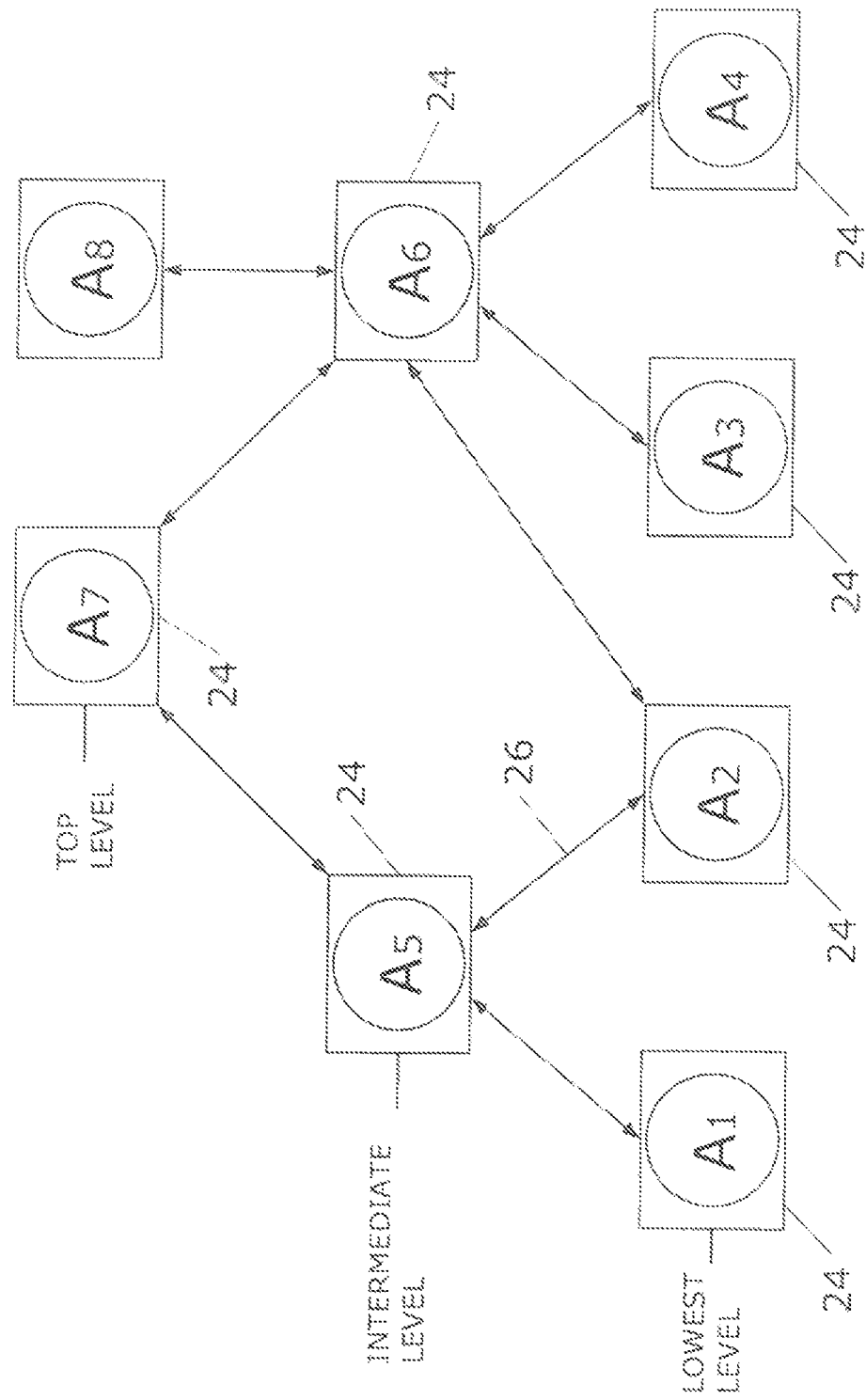
FIG. 2 is a schematic view, showing how agent interconnections can be organized into multiple tiers.

The communication between agents can assumes a wide variety of forms. FIG. 2 depicts a multi-tiered approach. At the lowest level multiple independent agents run on four separate computing devices 24. Communication links 26 are established so that an agent on one computing device can communicate with agents on other communicating devices. At the intermediate level the interconnections may become more complex, as shown. At the top level one of the computing devices receives information from all subordinates and a second computing device may receive only a subset. An agent may be hosted by each of these computing device. Such a structure might be applied to the task of data monitoring and abstracting. Each of the computing devices on the lowest level could be monitoring data traffic within a particular domain. Actual interconnections will likely be more complex that those shown in FIG. 2 and may contain many more levels.

Even for the simple example of FIG. 2, however, feeding all the data traffic up to the top level may overwhelm the available analytical ability or communication bandwidth. Thus, the host systems at the lowest level select only certain pieces of relevant information. This initially abstracted information is forwarded to the intermediate level. Further abstraction occurs at the intermediate level and a more concise set is forwarded to the top level.

Figure 3:
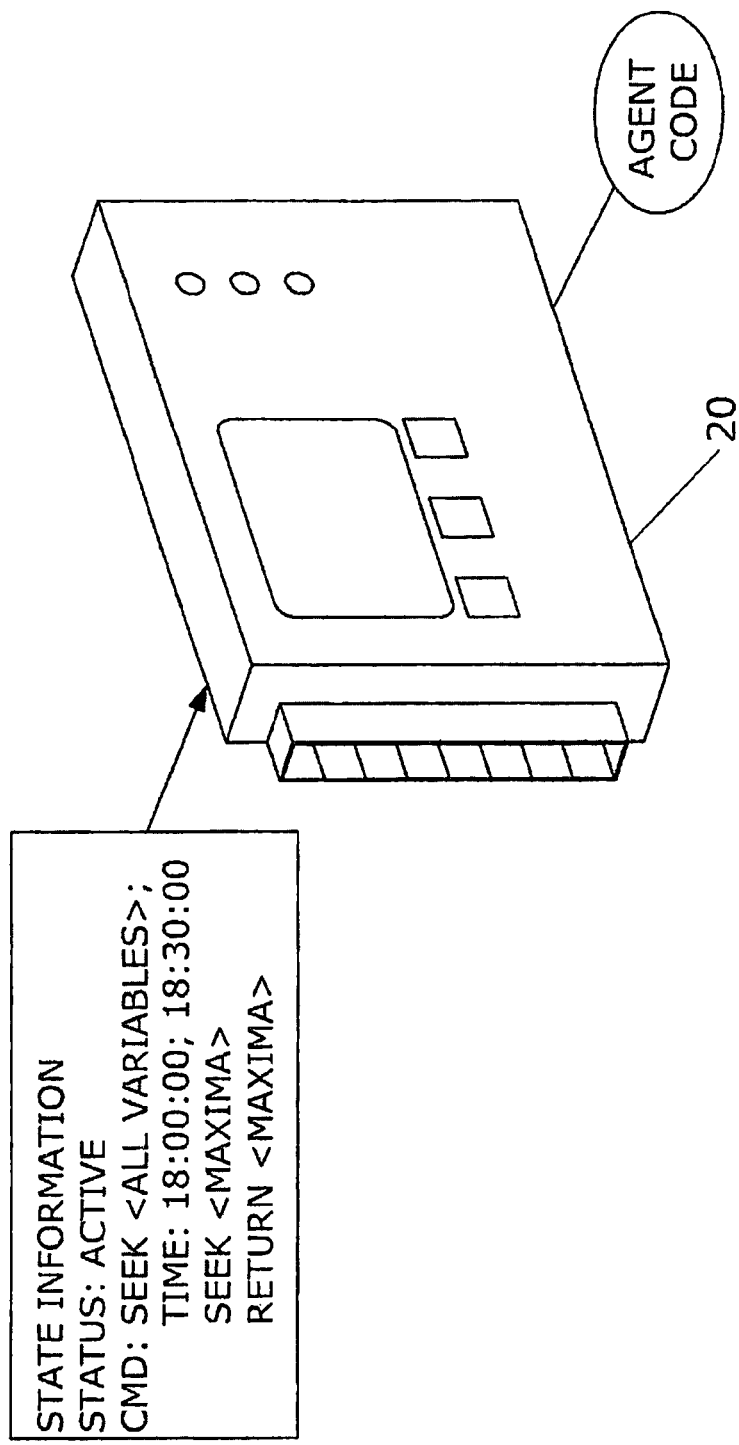
FIG. 3 is a schematic view, showing representative state information that can be transmitted to a computing device hosting an agent.

The communication to and from a particular agent may assume an endless variety of forms. FIG. 3 provides an example of a set of "state information" being sent to activate an agent residing on programmable logic controller 20. The transmission causes the software agent code already residing on the PLC to (1) obtain a value for all monitored parameters since the last request, (2) determine the maximum value for each parameter, and (3) return that maximum value to the requesting system.

Figure 4:
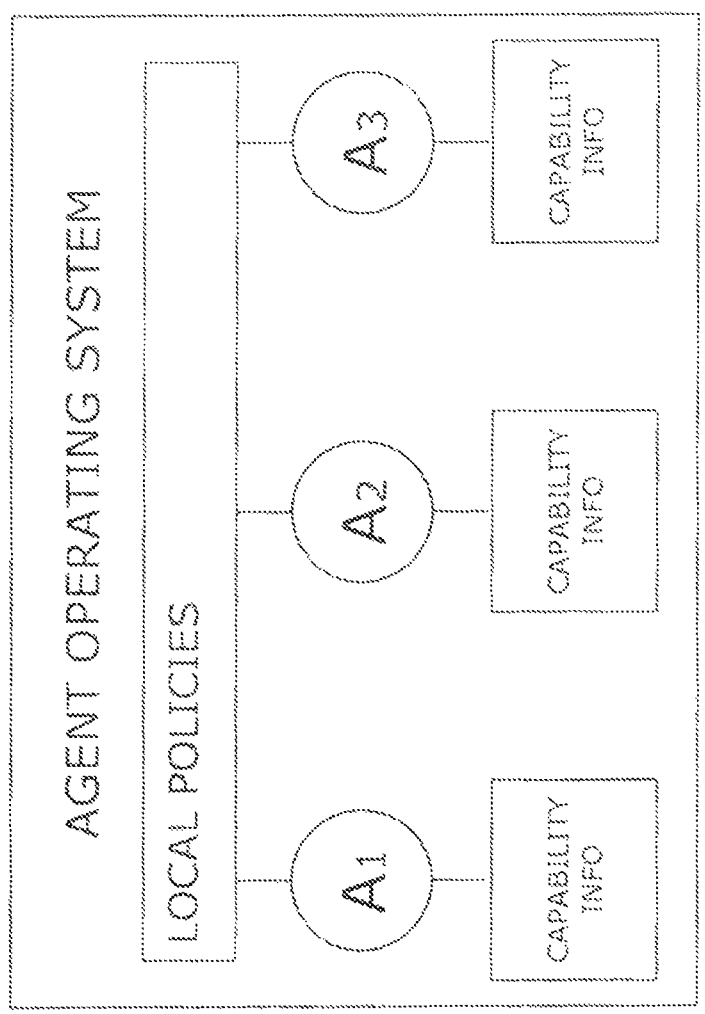
FIG. 4 is a schematic view, showing how an agent operating environment can be used to control the actions of a software agent.

An important concept in the present invention is that all agents operate within an agent operating system ("AOS") on the host computing device. This AOS provides local control over all possible agent actions and ensures that no agent takes an action the host does not allow or want. FIG. 4 graphically depicts this concept. All agents must act under the governance of local policies hosted within the AOS.

When an agent becomes active within the AOS, it preferably includes information regarding its intended functions and capabilities. These functions are preferably provided in a standard format so that they may readily be evaluated by the AOS. Additional policies specific to a particular agent may also be imported with that agent. However, tire AOS also governs conflicts between imported policies and local policies. Most users will configure the AOS so that local policies take precedence over anything else.

As an example, the host system may contain medial patient data. The agent may be designed to select particular types of cases (such as pneumothorax cases), aggregate that data, and send it up to a requesting system. The agent may arrive with instructions to collect patient-identifying information. However, the local policies do not allow the external transmission of any patient-identifying information, in that case, the agent would be allowed to aggregate the pneumothorax data and aggregate the outcome data, but would be required to remove all identifying information before transmitting it.

When relevant security policy allows, the creation of the code actually implementing the agents could be done automatically and the agent code could then be loaded in a suitable location. As an example, once a user selects a certain industrial process to be monitored, the system could evaluate the available host processor and select a piece of agent-implementing code that is suitable for that processor (considering things such as the operating system used on the host). The system could then go further by actually loading and testing the software without user supervision. The migration of agent code or activation states could also be partially or completely automated.

The system policies constrain the actions of the agents and the resources they use. For example, agent-to-agent communication traffic for all agents or for particular classes of agents could be prioritized so that non-critical messages are blocked during periods of limited communication bandwidth. The users are given the ability to create conditions of particular interest (such as a sinusoidal pressure variation in a chemical feed pump that might indicate a failing impeller).

The software agents typically filter the raw data on site and only pass along selected, abstracted, or analyzed information that the system as a whole needs to know. In the chemical process example, the locally-available "raw data" might be a pulsed voltage that indicates the rotational speed of a pump shaft. The over-arching system may mu need or want this information in most circumstances. Thus, the software agent is programmed to transform this information into only two states—"normal" or "abnormal." The policy provides that no transmission is to be sent for the "normal" state and that a transmission is obligated for the "abnormal" state.

The policies might also allow a defined user to see certain data and not others. A particular user might be cleared to know that a monitored function was "abnormal" but not cleared to know why.

Figure 5:
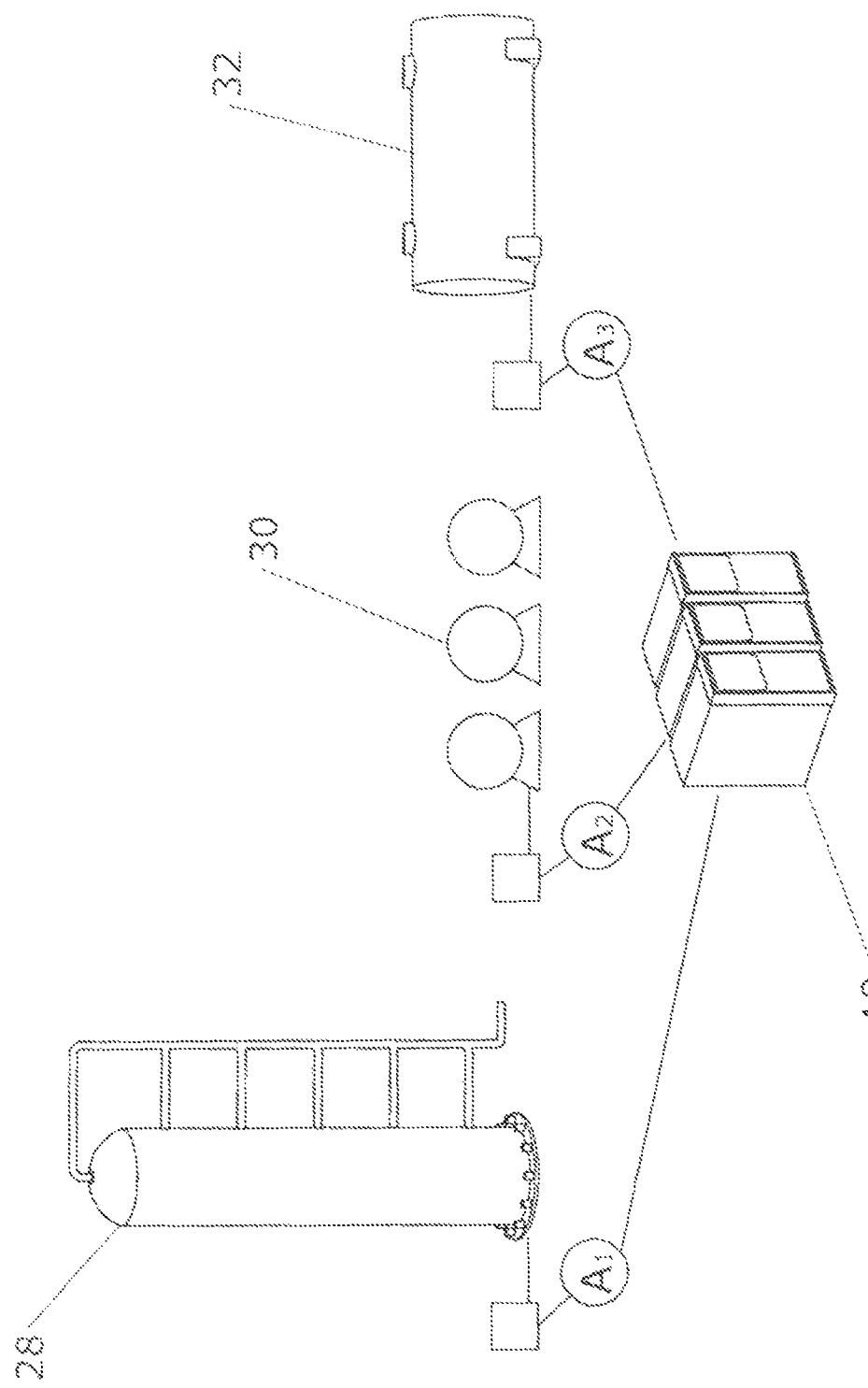
FIG. 5 is a schematic view, showing the use of agents to collect information in a chemical processing facility.

Software agents are useful in many situations, including those where the entity controlling the agent may have motives that are inconsistent with the entity controlling the host computing device. In such a situation the host authority has typically denied access to the agent, since there is little "trust." However, the present invention's use of local policy governance should alleviate this suspicion. FIG. 5 provides an illustrative example. In FIG. 5, software agents are used to monitor the operations of some of the components of a chemical facility.

The objective here is not overall process control. In fact, the agents are only monitoring three components (fractioning tower 28, pumping station 30, and boiler 32) of a much larger system. The purpose is to provide warranty support for a particular engineering firm that designed and installed those three components. The software agents are designed to serve the interests of the engineering firm. For instance, they malt collect data to assist in ongoing support of the facility, but also to monitor for improper use that could void a warranty claim. The presence of the software agents might in fact be a condition of the warranty. The plant management would be unlikely to allow the installation of such agents on its host computing devices without the ability to control the agent actions via the agent operating system.

Figure 6:
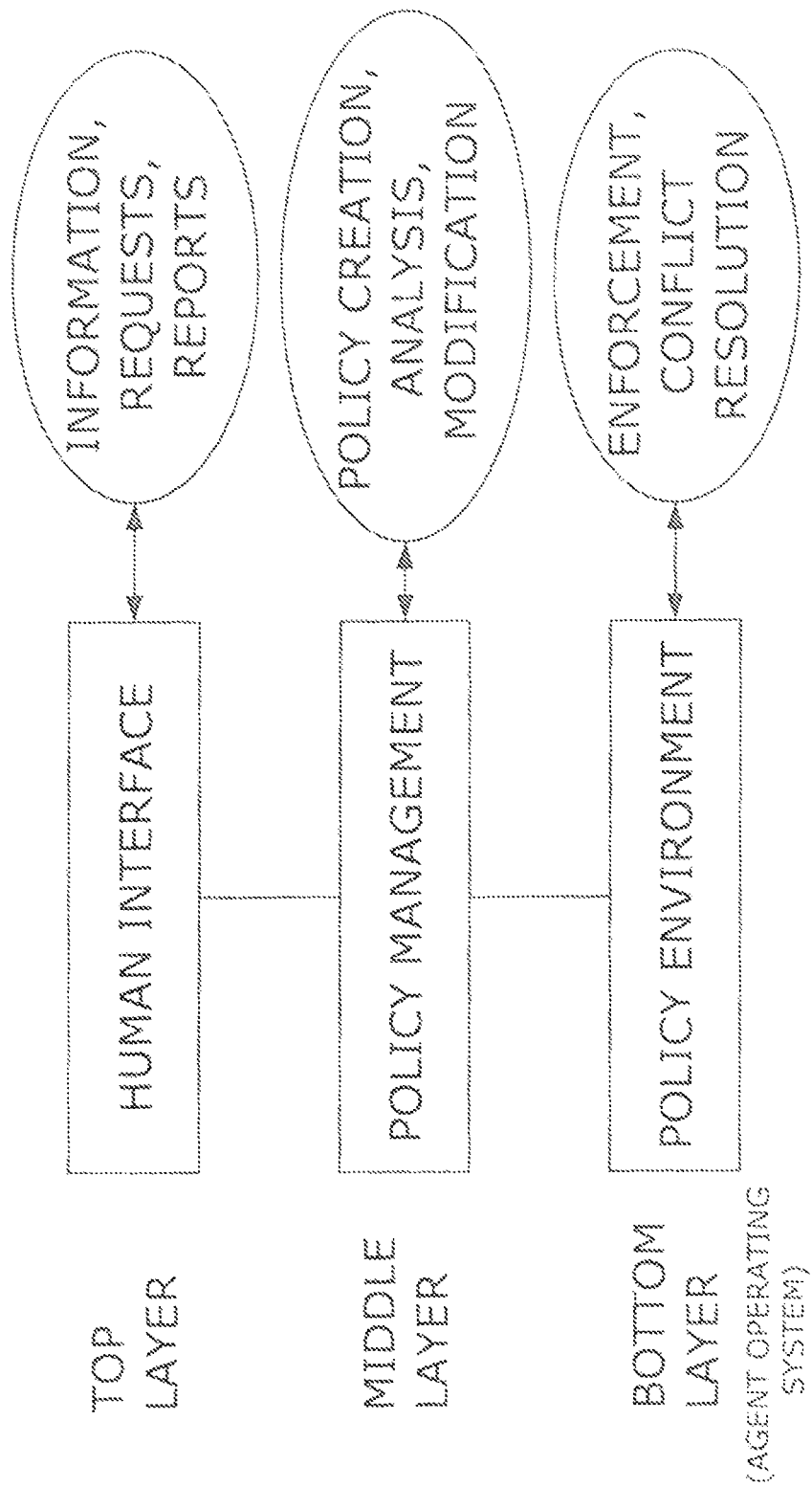
FIG. 6 is a schematic view, showing different layers that may be used to control and utilize software agents.

The preferred embodiments allow human users to interact easily with the software agent-based systems. It is preferable to provide a layered approach. FIG. 6 graphically depicts this approach. At the top layer is the human interface. This allows human input to the agents or agent system (including policy specification) and provides information from the agents or agent system visually. The human operators are also allowed to frame requests for agent-provided actions.

The middle layer is a policy management layer. At this level policies may be created, analyzed, or modified. Groups of agents may be created and differing linking relationships established. For example, a decision can be made to apply a group of polices to one group of agents and not to others. At the lowest level is the policy enforcement layer. This actually imposes the established policies on the software agents and makes sure they are adhered to. In the case of an agent system, a substantial part of policy enforcement may be performed by the AOS.

Policies are of two major types: authorizations (policies that allow or forbid a particular action in a given context) and obligations (policies that require or waive a requirement for a particular action in a given context). The types of policies that could be implemented are infinite Typical examples include:

1. An action requested by an actor is authorized vs. unauthorized for that actor (whether human or agent);
2. The performance of an action by one actor obligates that actor to do something else (such as report);
3. A reporting obligation imposed on an actor cannot be fulfilled by sending information to a specific list of recipients (forcing the actor to consider other fulfillment method); and
4. An obligation imposed on an actor requires its tasks or it interactions with human users to be performed in accordance with specified constraints (e.g., in a given conditional sequence or a specific conversational style).

Collective obligations can be created by the user with the carrying out of the result left to the system. As an example a collective obligation might specify what general action must be undertaken by some group of agents while leaving the details of how the task should be accomplished up to the individual agents who are under that obligation.

Whereas some agent systems use a variant of condition-action rules or XML to direct the work of agents, the present inventive system relies on policies that can be described with much richer, machine-interpretable semantics. Policies are required for two reasons: (1) The rich, formal models by which the policies are described more easily enable the kinds of powerful, contextually sensitive forms of machine interpretation needed by software agents performing complex tasks; (2) Due to the way advanced policy management systems are implemented, they can enforce agent system policies even on software agent aide that is inadvertently buggy or deliberately malicious. When an agent state migrates to a new host, it will be subject to the policies in place in that new computing environment. However, the local policies will not specify how the action is to be carried out or which individual agents should perform the task.

Certain policies could be considered inviolable and therefore not subject to change by a normal user. As an example, the state of operation of some of the components may be deemed secret under national "critical infrastructure" policy. If a normal user tried to create a policy for this information to be shared with an unauthorized person, policies may be put in place that would not allow that action. However, policies might allow other special classes of users (or even certain classes of software agents) to change or override such policies.

As stated previously, in order to gain the advantages of an agent-based framework it is important to provide a level of autonomy sufficient to allow agents to perform desired actions in an unimpeded manner. However, it is also important to retain control and predictability. To these ends, the code written to implement the agent system used in the present inventive method preferably includes the following attributes:

1. Observability. It is important to know how the agents are progressing on their assigned tasks. This is particularly true when the agent actions are interdependent (The action of a first agent depends at least in part on the actions of another). The present invention includes built-in mechanisms and policies for progress appraisal that allow the agent system to take much or all of the burden for this functionality away from programmers of individual agents;

2. Directability. When agents need to be redirected due to changes in priorities, the acquisition of new information, or component failures, the policy system on which the agent system relies affords users the ability to modify the authorizations or obligations imposed on particular agents or classes of agents as the processes are running. This functionality includes the ability to modify life-cycle controls, such as pausing or resuming the activities of agents or classes of agents;

3. Interpredictability. The inventive method preferably includes the ability to assess an agent's progress on an assigned task against its past history or work on similar tasks. This provides early detection of a problem. However, interpredictability includes more than progress and history. For example, it involves users and other agents knowing that an agent can't violate authorization policies and that an agent will fulfill obligations (including sharing state, plans, or similar information with other agents specifically in support of interpredictability);

4. Learning. The observability of the agents can be used to support the ability to leant new policies. New governing policies may preferably be created programmatically (by operation of software and without human intervention). For example, a new policy might be created after observing that a whole class of agents was repetitively undertaking a task that could be accomplished by a smaller group of agents. A new policy might also be created based on an individual agent's collected data concerning a human operator's behavior. The process of learning itself could be made subject to policies relating to the scope of adaptation permitted in a given context. All of this may also be made subject to a requirement for human oversight (such as an automated suggestion of a new governing policy that requires human approval); and 5. Multiplicity. If it is desired to have multiple perspectives on the same data from differing vantage points, one can implement a policy-based enforcement of data consistency across these perspectives. As an example, policies could ensure that changes in one view of die data would correctly propagate to other views of that data. If policies in place in a given computing environment did not allow the viewing of certain data, the views of that data might appear differently in one place than another.

The inventive method thus disclosed may be applied to practically any type of computing environment. Some simple examples may aid the reader's understanding. First, one could design an agent-based network for home healthcare. A software agent would be placed on a patient's home computer. The agent would be subject to policies about the conditional sequencing of its tasks. Every day the agent would prompt the patient with context-specific questions (such as inquiring about blood sugar, diet, and physical activity). The agent would interact with the user through the use of conversion policies. The agent would rely on policies to filter this information and—when appropriate—the agent would pass along information to a doctor's computer system. The information passed along might be limited to that which the doctor would deem useful in treating the patient.

Some of the policies that could be created to govern such a home-health agent might include location issues, such as:

1. Only prompt for vital signs when the patient is home;
2. Do not prompt for vital signs when the patient is traveling, as indicated by being more than N miles from home:
3. Do not prompt for any information when the patient's computing device is in motion, unless the location information indicates that the patient is traveling via public transportation; and
4. Only prompt for weight information when the patient is home.

Some of the policies could relate to timing issues such as:

1. Never prompt for vital signs before 8 A.M. or after 9 P.M.;
2. Never prompt for vital signs during any period when the patient's calendar indicates an appointment;
3. Only prompt for daily summary eating and exercise questions at the end of the day; and
4. Blood pressure must be obtained at least once per day and, if no measurement made, create an alert.

Software agents can perform many other functions. For example, an agent could be programmed to look after the patients interests. The agent might monitor other information coming into the patient's computer system and label it according to the apparent motivation of the sender (such as "This information is sent by an advertiser").

A more sophisticated example might be an agent network designed to assist a wounded veteran in receiving appropriate care from the Veteran's Administration. This example would likely involve layers of agents operating in a patient's computer (including the patient's personal schedules, contacts, etc.—as protected by agent policies), a billing system's computer, and a regional medical center's system. The agent could rely on policies appropriate to the class of user to inform the patient of different treatment options that might not be obviously available. Coordination of transportation and appointment making could also be handled through agents, governed by a combination of policies defined by the user and the other organizations with which the user interacts. The agent could also gather and summarize outcome data for the patient or doctor's review.

One of the main advantages of the proposed system is the ability control/trust the behavior of agents created by other people when that agent is operating on your own system and working with your own data. The following points describe features and characteristics of one or more embodiments of the invention:

1. Policy enforcement within live agent framework (the "agent container" or Agent Operating System), in addition to enforcement within the agent s code. In some cases the container can enforce policy on malicious or buggy agents such as when the container is the subject of the policy or an intermediary of the agent's actions. For example, one could have a policy within the container whereby agents may only discover each other and exchange messages within the container. Policies can therefore be enforced by the container to allow, forbid, or oblige any type of messages without needing requiring each individual agent to include code to check and follow such policies. Similarly, the container may be set up such that the only way agents can access certain data or resources is through interaction with the container, thereby ensuring policy control over these agent actions.

2. Aggregation of policy sets and conflict resolution within policy sets. An agent may be governed by both the policies of its owner (policies sent with the agent to a remote "agent container" on another system) and the policies of the remote container in which the agent currently resides and runs (policies defined by the container owner separate from the agent policies). An important innovation in this area is a "precedence policy"—a special type of policy indicating that one type of policy takes precedence over another type. For example, policies about data access actions that are defined by the container owner take precedence over policies about data access that are defined by the agent owner.

3. Representing agent capabilities as policy-governed actions. Every task that an agent can perform (e.g. every method or function in the code) may have a corresponding representation in a policy model (e.g. a specific ontology) that is external to the agent and available to the policy system.

4. Representing and reasoning about agent code (e.g., Java) as policy-governed actions.

5. Automated mapping of agent source code interfaces (e.g. Java method signatures) to a model of agent actions (e.g. OWL ontology classes and instances). This externalizes the interface to the agent code to makes it available for use in the policy system to allow, forbid, or oblige calling the code.

6. Used for obligation enforcement: the agent framework can directly invoke agent code (e.g., Java methods) as a means of enforcing obligation policies.

7. Agent framework enables bringing axle to where the data is located.

8. Ability to change agents' behavior through policy at will while the agent is running (not modifying agents' code).

9. Reasoning about agent behavior (code) in declarative logic using the policy ontology representation of such behavior. This enables making automated inferences about the agent behavior.

10. Ability to have a container trigger an obligation to be fulfilled by the agent. This feature enables having a specific class of agents be required to perform agent-specific actions when the container performs lifecycle events. For example, when the container creates an agent, it may oblige the agent to wait 24 hours before beginning its work. Before the container stops an agent, it may require the agent to notify its owner and/or write its current state to a log file.

11. Control groups of agents based on common attributes that may be transient. This attributes are rich and essentially unlimited, for example: agents that started within the last hour, agents that have accessed certain files or databases, agents that have communicated with agents from another group within the last week, agents that are idle, agents that moved to the current container from another specified container, agents that write log files, etc.

12. General-purpose policy-based control (vs. just access control) of agent groups with dynamic membership based on some common attribute(s) that may be transient.

13. Progress appraisal management and distribution is performed by the agent container and controlled using policies. This feature provides agent progress updates in conditions where the agents themselves cannot (e.g., agent is stopped or paused, agent is buggy or malicious, agent doesn't have visibility into overall progress of its dependencies or teammates)

14. Registration/de-registration of users and agents to receive progress updates from other agents.

15. Periodically querying agents for current progress and automatically distributing progress reports to interested parties.

16. A host computing system will generally have a governing authority, meaning one or more human beings who are responsible for operation of the host computer. These persons will typically set the policies for the agent operating system. However, it is also possible to have a governing authority for the agent operating system that is separate from the governing authority for the host computing system. The governing authority for a host computing system is concerned with many things—such as OS upgrades, hardware maintenance, etc. It is possible to have a separate governing authority only for the agent operating system. Such a separate authority might not be concerned with more mundane computing system issues. An "external authority" is some separate person or group not under the control of the governing authority. An agent is typically placed according to the wishes of an external authority. The external authority may not actually create the agent (though that could be the ease). Rather, the external authority desires that the agent operate on the host computing system.

The preceding descriptions contain significant detail regarding the novel aspects of the present invention. They should not be construed, however, as limiting the scope of the invention but rather as providing illustrations of the preferred embodiments of the invention. As an example, the nature of the graphical interface provided to the users could take many different forms. Many other variations are possible. Thus, the scope of the invention should be fixed by the claims eventually drafted, rather than by the examples given.

Having described our invention, we claim:

1. A software agent control system, comprising:
   a. a host computing device, the actions of which are governed by a governing authority;
   b. an agent operating system running on said host computing device, said agent operating system including a set of local governing policies established by said governing authority for said host computing device, said agent operating system controlling all possible actions of any software agent residing on said host computing device;
   c. a software agent approved by an external authority, said software agent embodied by software code running on said host computing device and an operational active state, said operational active state sent to said host computing device by a second external computing device, said software agent including a list of intended functions and capabilities in a standard format agreed by said external authority and said governing authority, said list of intended functions and capabilities configured for evaluation by the agent operating system;
   d. said software agent being governed by imported policies not controlled by said governing authority of said host computing device;
   e. said software agent only being permitted to operate within said agent operating system;
   f. said agent operating system requiring said software agent to provide information to said agent operating system regarding said software agent's intended functions and capabilities in said standard format;
   g. said agent operating system being configured to use said list of intended functions and capabilities in said standard format to deny any proposed function of said agent that conflicts with said local governing policies;
   h. said agent operating system being configured to use said list of intended functions and capabilities to allow any proposed function of said agent that complies with said local governing policies; and
   i. said agent operating system being configured to analyze any conflict between said set of local governing policies and said imported policies imported with said software agent and resolve any detected conflict in favor of said local governing policies.

2. A software agent control system as recited in claim 1, further comprising:
   a. a second software agent approved by an external authority and running on said host computing device; and
   b. wherein said second software agent can only communicate with said software agent via said agent operating system.

3. A software agent control system as recited in claim 2, wherein said second software agent can only detect a presence of said software agent via said agent operating system.

4. A software agent control system as recited in claim 1, wherein said software agent is only able to access data available to said host computing device through said agent operating system.

5. A software agent control system as recited in claim 1, further comprising a human user interface configured to allow said governing authority of said host computing device to set and modify said set of policies within said agent operating system.

6. A software agent control system as recited in claim 1, wherein:
   a. said software agent includes its own set of associated governing policies;
   b. said agent operating system includes the ability to resolve conflicts between governing policies set by the agent operating system and governing policies associated with said software agent.

7. A software agent control system as recited in claim 6 wherein said agent operating system ensures that said governing policies set by said agent operating system take precedence over said governing policies associated with said software agent.

8. A software agent control system as recited in claim 7, wherein said software agent is only able to access data available to said host computing device through said agent operating system.

9. A software agent control system as recited in claim 6, wherein said software agent is only able to access data available to said host computing device through said agent operating system.

10. A software agent control system as recited in claim 1, wherein said agent operating system is configured to restrict said software agent's ability to communicate with computing systems outside said host computing system during periods of limited communication bandwidth.

11. A software agent control system, comprising:
    a. a host computing device;
    b. an agent operating system running on said host computing device, said agent operating system including a set of local governing policies established by a governing authority for said agent operating system, said agent operating system controlling all possible actions of any software agent residing on said host computing device;

c. a software agent approved by an external authority, said software agent embodied by software code running on said host computing device and an active operational state, said operational active state having been sent to said host computing device by a second external computing device, said software agent including a list of intended functions and capabilities in a standard format agreed by said external authority and said governing authority, said list of intended functions and capabilities configured for evaluation by the agent operating system;

d. said software agent being governed by imported policies not controlled by said governing authority of said agent operating system;

e. said software agent only being permitted to operate within said agent operating system;

f. said agent operating system requiring said software agent to provide information to said agent operating system regarding said software agent's intended functions and capabilities in said standard format;

g. said agent operating system being configured to use said list of intended functions and capabilities in said standard format to deny any proposed function of said agent that conflicts with said local governing policies; and h. said agent operating system being configured to use said list of intended functions and capabilities to allow any proposed function of said agent that complies with said local governing policies; and i. said agent operating system being configured to analyze any conflict between said set of local governing policies and said imported policies imported with said software agent and resolve any detected conflict in favor of said local governing policies.

12. A software agent control system as recited in claim 11, further comprising:

a. a second software agent approved by an external authority and running on said host computing device; and b. wherein said second software agent can only communicate with said software agent via said agent operating system.

13. A software agent control system as recited in claim 12, wherein said second software agent can only detect a presence of said software agent via said agent operating system.

14. A software agent control system as recited in claim 11, wherein said software agent is only able to access data available to said host computing device through said agent operating system.

15. A software agent control system as recited in claim 11, further comprising a human user interface configured to allow said governing authority of said host computing device to set and modify said set of policies within said agent operating system.

16. A software agent control system as recited in claim 11, wherein:

a. said software agent includes its own set of associated governing policies;

b. said agent operating system includes the ability to resolve conflicts between governing policies set by the agent operating system and governing policies associated with said software agent.

17. A software agent control system as recited in claim 16 wherein said agent operating system ensures that said governing policies set by said agent operating system take precedence over said governing policies associated with said software agent.

18. A software agent control system as recited in claim 17, wherein said software agent is only able to access data available to said host computing device through said agent operating system.

19. A software agent control system as recited in claim 16, wherein said software agent is only able to access data available to said host computing device through said agent operating system.

20. A software agent control system as recited in claim 11, wherein said agent operating system is configured to restrict said software agent's ability to communicate with computing systems outside said host computing system during periods of limited communication bandwidth.

* * * * *